United States Patent [19]

Tarusawa

[11] 4,184,321

[45] Jan. 22, 1980

[54] ELECTRONIC WRISTWATCH WITH CALCULATOR HAVING IMPROVED CONDUCTIVE PACKING SHEET SWITCH ELEMENT

[75] Inventor: Yasutaka Tarusawa, Suwa, Japan

[73] Assignee: Kabushiki Kaisha Suwa Seikosha, Toyko, Japan

[21] Appl. No.: 798,959

[22] Filed: May 20, 1977

[30] Foreign Application Priority Data

May 20, 1976 [JP] Japan ........................... 51/64231[U]

[51] Int. Cl.[2] ........................ G06F 3/02; G06F 15/02; H01H 9/04

[52] U.S. Cl. ................................ 58/152 R; 200/5 A; 200/159 B; 200/302; 364/705; 364/709

[58] Field of Search .................. 200/5 A, 1 R, 159 A, 200/159 B, 302, 340; 58/152, 85.5, 50 R; 340/365 R; 364/705

[56] References Cited

U.S. PATENT DOCUMENTS

| | | | |
|---|---|---|---|
| 3,699,294 | 10/1972 | Sudduth | 200/5 A X |
| 3,803,834 | 4/1974 | Reese | 58/152 R |
| 3,898,421 | 8/1975 | Suzumura | 200/159 B |
| 3,928,960 | 12/1975 | Reese | 58/152 R |
| 3,932,722 | 1/1976 | Obata et al. | 200/340 |
| 3,946,182 | 3/1976 | Holder | 200/159 B |
| 3,973,099 | 8/1976 | Morris, Sr. | 58/85.5 |
| 3,978,297 | 8/1976 | Lynn et al. | 200/159 B X |
| 4,007,364 | 2/1977 | Ojima et al. | 200/5 A X |
| 4,017,848 | 4/1977 | Tannas, Jr. | 340/365 R |
| 4,019,037 | 4/1977 | Monna | 58/152 R X |
| 4,028,509 | 6/1977 | Zurcher | 200/5 A |
| 4,062,181 | 12/1977 | Zurcher | 58/152 R |
| 4,072,004 | 2/1978 | Tanaka et al. | 200/159 B |
| 4,117,279 | 9/1978 | Schoemer | 200/302 X |
| 4,128,889 | 12/1978 | Ojima et al. | 200/5 A X |

*Primary Examiner*—James R. Scott
*Attorney, Agent, or Firm*—Blum, Kaplan, Friedman, Silberman & Beran

[57] ABSTRACT

A digital display electronic wristwatch having a calculator therein includes a single actuating packing sheet of a resilient material formed with projections to register with the input keys for making electrical contact with terminals on the watch and calculator body. The packing is formed with at least one opening for viewing the digital display of time and calculator data.

17 Claims, 7 Drawing Figures

FIG. 6
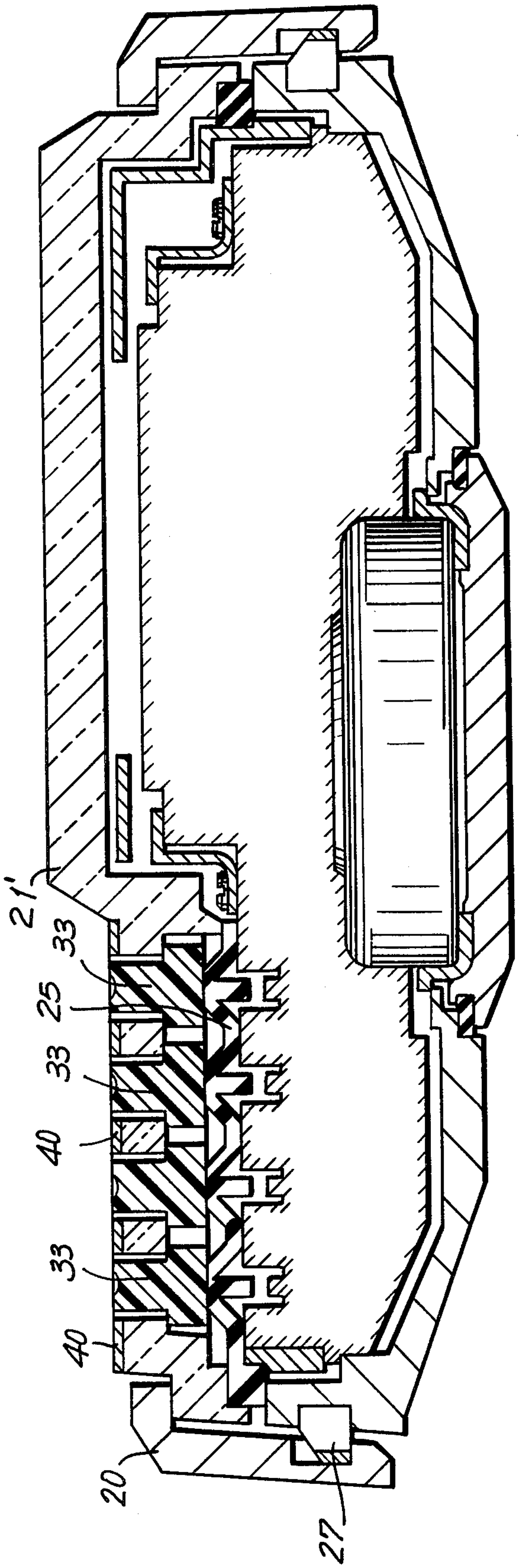
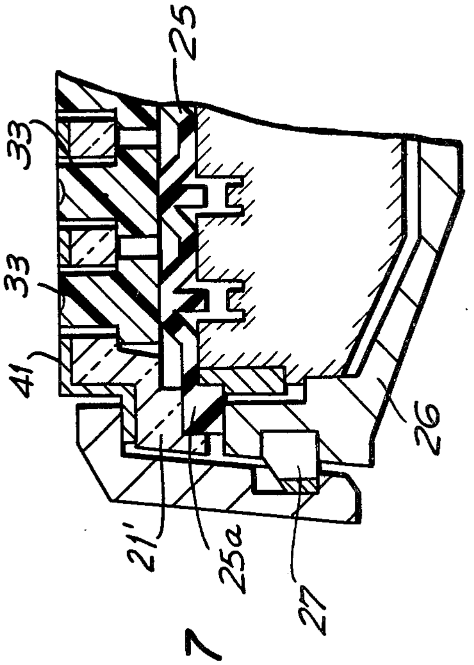
FIG. 7

ELECTRONIC WRISTWATCH WITH CALCULATOR HAVING IMPROVED CONDUCTIVE PACKING SHEET SWITCH ELEMENT

BACKGROUND OF THE INVENTION

This invention relates generally to an improved digital display electronic wristwatch, and in particular to an improved electronic wristwatch having a calculator therein.

Digital display electronic wristwatches having a calculator have become popular recently. However, the wristwatch tends to be large and thick in order to house the watch, calculator and input keys in the watch case. Another disadvantage of conventional digital display wristwatches having a calculator is that they are not water-tight and dustproof. The input keyboard surface tends to be large due to positioning numerical and operational input symbols on the top of each of the keys of the keyboard. As each key in this type of conventional construction is unique, assembly costs are increased due to the necessity of locating and positioning a key in its correct position.

SUMMARY OF THE INVENTION

Generally speaking, in accordance with the invention, a digital display electronic wristwatch having a calculator therein is provided which overcomes the disadvantages of prior conventional wristwatches having a calculator. A wristwatch constructed and arranged in accordance with the invention includes a one piece actuating packing sheet formed with projections provided between the input keys and the watch body for making electric contact with terminals provided on the watch body. In another embodiment, input keys free of numerical and operational symbols on the key surface are provided.

Accordingly, it is an object of this invention to provide an improved digital display electronic wristwatch having a calculator therein.

Another object of the invention is to provide an improved digital display electronic wristwatch having a calculator therein of improved design.

A further object of the invention is to provide an improved digital display electronic wristwatch having a calculator utilizing a single actuating packing sheet.

Still another object of the invention is to provide an improved digital display electronic wristwatch having a calculator which is waterproof and dustproof.

Another object of the invention is to provide an improved digital display electronic wristwatch having a calculator wherein the calculator keys are interchangeable during assembly.

Still other objects and advantages of the invention will in part be obvious and will in part be apparent from the specification and drawings.

The invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 6 is a cross-sectional view of the wristwatch of FIG. 4 taken along line 6—6 and;

FIG. 7 is a partial cross-sectional view of another embodiment of the wristwatch of FIG. 6.

DESCRIPTION OF THE PREFERRED EMBODIMENTS

Figure 1:
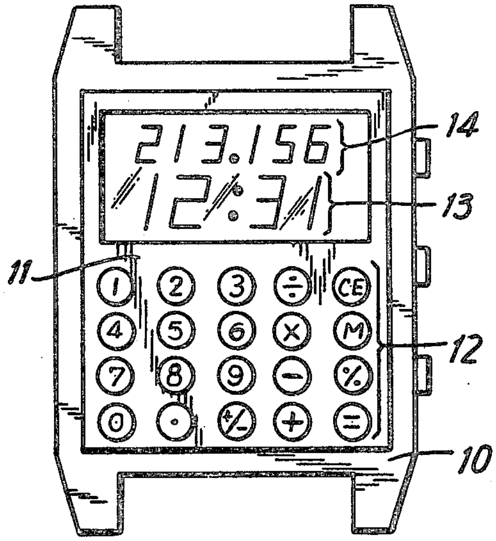
FIG. 1 PRIOR ART
FIG. 1 is a plan view showing the construction of a conventional digital display electronic wristwatch having a calculator therein.

In FIG. 1, a conventional digital watch with calculator therein is shown wherein watch case 10 is formed with an opening for cover glass 11. Cover glass 11 is formed to support input keys 12 in a keyboard portion and to overlie a digital display having digits 13 for display of time and digits 14 for display of calculator data. The numerical and operational symbols for input keys 12 are shown displayed on the top surface of each of the keys. In order to display clearly the key symbols in this manner, it is necessary to provide each key with sufficient upper surface area for each numerical and operational symbol. When as many as twenty large individual keys are provided as shown in FIG. 1, the keyboard region is large, increasing the size of the entire watch.

Figure 2:
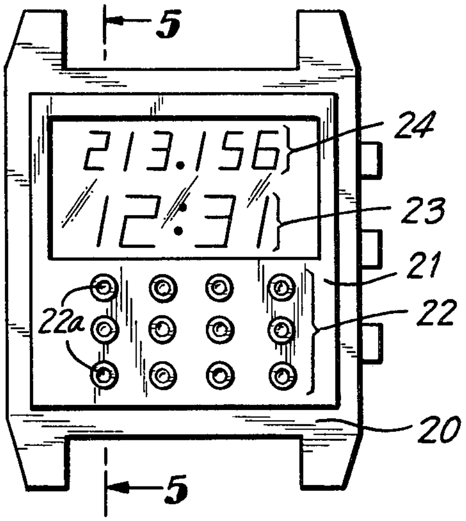
FIG. 2 is a plan view of a digital display electronic wristwatch having a calculator therein constructed in accordance with an embodiment of the invention.

Referring now to FIG. 2, a plan view of a digital display electronic wristwatch having an electronic calculator therein constructed and arranged in accordance with an embodiment of the instant invention is shown. Watch case 20 is formed with an opening for positioning cover glass 21. Cover glass 21 is formed with a plurality of openings in a keyboard region for supporting input keys 22 and further permits viewing of a digital display including digits 23 for displaying time and digits 24 for displaying calculator data. Input keys 22 are shown free of identifying numerical and operational symbols. Such symbols (not shown) could be provided on cover glass 21 as more particularly described in connection with FIGS. 4 and 6.

Figure 3:
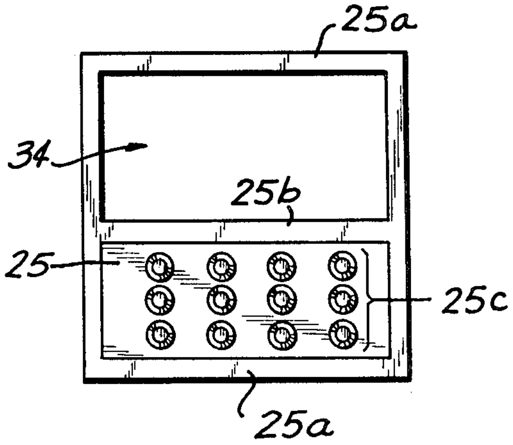
FIG. 3 is a plan view of a single actuating packing sheet of the invention.

FIG. 3 is a plan view of a single actuating packing sheet 25 for the wristwatch of FIG. 2. Packing sheet 25 is formed with at least one opening 34 to permit viewing the digital display bearing digits 23 and 24 and is positioned in watch case 20 below cover glass 21 and input keys 22. Packing sheet 25 is formed with upward frusto-conical projections 25c in a region which will be beneath the keyboard region and will be described more fully below with respect to FIG. 5. There are as many frusto-conical projections 25c formed in packing sheet 25 as there are input keys 22 and they are positioned to register with the base of input keys 22.

Packing sheet 25 is fabricated from a resilient material, such as a synthetic resin, a soft metal or synthetic rubber which provides an adequate seal between cover glass 21 and case back 26 and abuts resiliently against input keys 22. In a preferred embodiment the packing sheet material is electrically conductive or a conductive coating is applied to the underside of the packing sheet. In a further embodiment where a non-conductive material is used, a metal member may be positioned on the lower surface of packing sheet 25 for transmitting electricity.

Figure 5:
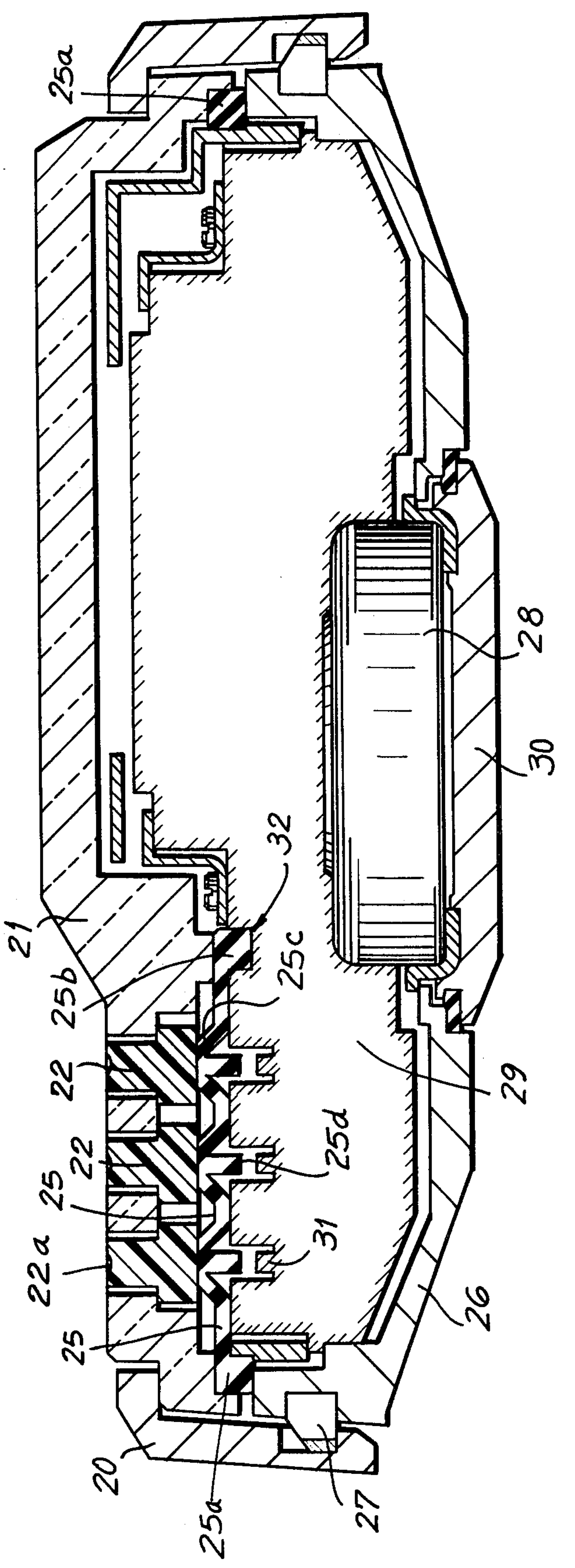
FIG. 5 is a cross-sectional view of the wristwatch of FIG. 2 taken along line 5—5.

FIG. 5 is a cross-sectional view of the wristwatch of FIG. 2 taken along line 5—5. Watch case 20 is formed with a peripheral lip extending inwardly about the opening therein. Case back 26 is shown releasably mounted in watch case 20 and secured in position by spring 27 of radial elasticity. Case back 26 is formed with an opening for battery 28 which is mounted in watch case 20 from below through the opening in case back 26. Battery 28 is secured in position in the wristwatch abutting watch and calculator body 29 by battery cover 30. Thus, the wristwatch periphery is formed by watch case 20, cover glass 21, case back 26 and battery cover 30.

Cover glass 21 is formed with a plurality of openings in a keyboard region for input keys 22. As shown in FIG. 2, twelve input keys are provided, by way of example, corresponding to the desired numeric and functional symbols. Input keys 22 are formed with a cylindrical base and an upper portion of a cylinder of smaller diameter to fit into a circular opening in cover glass 21. Input keys 22 are positioned in the openings in cover glass 21 with the upper surface of the keys forming a plane with the upper surface of cover glass 21. The upper surface of the lower cylinder of input keys 22 abuts the lower surface of cover glass 21. Each input key 22 is supported by a frusto-conical projection **25*c* formed in actuating packing sheet 25 to register with the base of a corresponding input key 22. The upper surface of input keys 22 may be formed with a depression 22*a*** for depressing the key with the tip of a ball-point pen or other sharp object.

Packing sheet 25 is formed with fingers **25*d* and positioned on the underside of and projecting from the base of each hollow frusto-conical projection 25*c* for contacting terminals 31 formed on watch and calculator body 29. Said body incorporates the watch and calculator circuitry. When operating the calculator and an input key 22 is depressed, a conductive finger 25*d* makes contact with a terminal 31 to complete an electrical circuit (not shown). Upon release of pressure, the input key 22 returns to its original position by resilient force from the distorted frusto-conical sheet projection 25*c* of packing sheet 25. Contact 31 need not be responsive to electrical energization but can be pressure sensitive, in which case fingers 25*d* need not be conductive. Contact 31 constitutes a multi-input means for providing input for the calculator of watch and calculator body 29**.

Packing sheet 25 is provided further with downwardly projecting peripheral lip **25*a* about the periphery and a second lip 25*b* between the keyboard region and opening 34. The second lip 25*b* engages matched groove 32 in watch body 29 positioned between the keyboard region and the opening for viewing the digital display. Peripheral lip 25*a* of packing sheet 25 is compressed between cover glass 21 and the leading edge of case back 26. By providing the solid one-piece actuating packing sheet 25 below cover glass 21 and input keys 22, watch and calculator body 29 is sealed. Water and dust cannot enter the inner portion of the wristwatch due to the seal formed by actuating packing sheet 25. In particular, lips 25*a* and 25*b* seal and protect from water and dust the region of contacts 31 through the use of a single member. Further, by using a resilient sheet a biasing means is provided to return input keys 22** to their original position resulting in a simplification in construction of the wristwatch as well as providing the waterproof and dustproof wristwatch.

Figure 4:
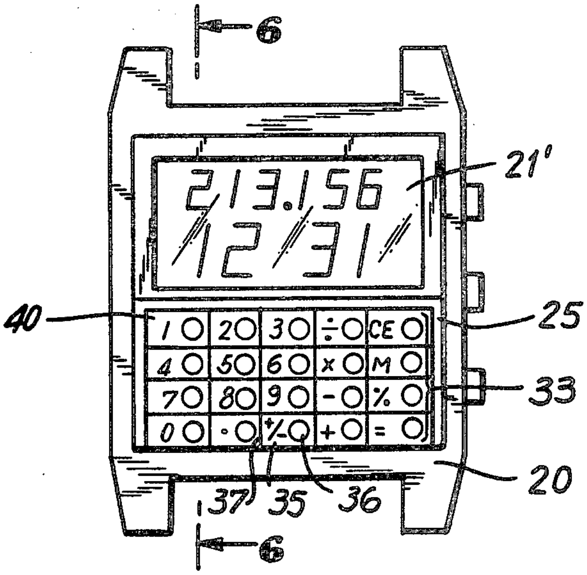
FIG. 4 is a plan view of a wristwatch constructed in accordance with a second embodiment of the invention.

Referring now to FIG. 4, a plan view of a digital display electronic wristwatch with an electronic calculator constructed and arranged in accordance with another embodiment of the invention is shown. Input keys 33 are free of numerical and operational input symbols. Each number and operational symbol is displayed in a region adjacent to its respective input key 33. For example, the operational symbol "+/−" in the fourth line, third row is identified at 35 to the left of the +/− input key 36. The number or symbol may be provided on a display board positioned on a surface of cover glass 21' as more fully described below with respect to FIGS. 6 and 7.

By providing the numerical and operational symbols in a region adjacent to input keys 33, the size of the input keys may be reduced to a diameter as small as, for example, 1 mm. In turn, the entire planar surface of the watch face is reduced in size. In addition, input keys 33 free of identification are now interchangeable resulting in simplification and ease of assembly of the wristwatch.

Referring now to FIG. 6, a cross-sectional view of a wristwatch constructed and arranged in accordance with yet another embodiment of the invention is shown. Display panel 40 to carry numerical and operational symbols is shown positioned across the top surface of cover glass 21'. Display panel 40 is a sheet which may be fabricated from a thin metal, such as, aluminum or a plastic material. The display panel may be painted with the numeral or symbol in a different color than the background or the symbols may be formed as openings in the panel visible due to contrast with the background.

Referring now to FIG. 7, a partial cross-sectional view of yet a further embodiment of a wristwatch constructed and arranged in accordance with the instant invention is shown. Display panel 41 for carrying numerical and operational symbols is shown extending to the outer periphery of cover glass 21'. By extending panel 41 to the periphery of cover glass 21', display panel 41 is compressed between the peripheral lip of watch case 20 and cover glass 21' to insure further a water-tight and dust free seal for the wristwatch.

It will thus be seen that the objects set forth above, among those made apparent from the preceding description, are efficiently obtained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention in which, as a matter of language, might be said to fall therebetween.

What is claimed is:

1. A digital display electronic wristwatch having a calculator therein comprising watch and calculator body means including display means and multi-input means; watch case means adapted to permit viewing of said display means and including at least ten openings therethrough for defining a keyboard region for permitting actuation of said multi-input means; and a unitary packing sheet means of a resilient material positioned intermediate said watch case means and said multi-input means disposed over the keyboard region and having an electrically conductive surface on the side disposed towards said multi-input means and further having a peripheral lip of a larger thickness than the keyboard region positioned around said multi-input means for providing a water-tight seal about said watch case means openings by being compressed by said watch case means, and a portion of said packing sheet disposed over the keyboard region of said multi-input means adapted for manipulation through said openings to effect selective actuation of said ,multi-input means, said packing sheet means formed with a hollow frusto-conical projection for each opening in the keyboard region, said projections projecting from said sheet toward said openings and a finger projection from each said projection towards and in registration with each of said multi-input means, whereby manipulation of a projection through the associated openings displaces said finger to the associated multi-input means for making contact with said multi-input means for the selective actuation of said multi-input means, said finger returning to its original position upon the release of said projection due to the resiliency of the packing sheet.

2. The wristwatch of claim 1, including a key member mounted for displacement in each of said watch case means openings in engagement with the projecting end of the associated projection, whereby a selected multi-input means may be actuated by engagement by a user from outside of said watch case means of the associated key member to displace the associated finger into engagement with said multi-input means, said key member returning to its original position upon release by said user due to the resiliency of said resilient sheet.

3. The wristwatch of claim 1, including a key member mounted in each of said watch case means openings for selective displacement from outside of said watch case toward the associated multi-input means to effect actuation thereof by said packing sheet means.

4. The wristwatch of claim 3, including a plurality of said key members and a corresponding plurality of watch case means openings arranged in a keyboard region of said watch case means.

5. The wristwatch of claim 4, wherein said watch case means includes a watch case formed with a first enlarged opening on the display side of said case and a cover glass mounted in said first enlarged opening, said cover glass being formed with said watch case means openings associated with said multi-input means for defining the keyboard region.

6. The wristwatch of claim 5, wherein said packing sheet means is retained in sealing relation at least in part between said cover glass and said watch case.

7. The wristwatch of claim 6, wherein said packing sheet means is retained in sealing relation between said cover glass on the one hand and said watch case and watch and calculator body on the other hand.

8. The wristwatch of claim 7, wherein said first enlarged opening of said watch case extends so as to overlie said display means to render said display means visible through said cover glass, said unitary packing sheet means including a portion extending around the periphery of said cover glass and defining a water-tight seal between said cover glass and said watch case.

9. The wristwatch of claim 8, wherein said watch case includes a second enlarged opening therethrough and a case back member, the portion of said watch case defining a sealing relation with said packing sheet means being said case back member.

10. The wristwatch of claim 5, wherein said key members are free of input and operational symbols.

11. The wristwatch of claim 10, wherein said numerical and operational symbols for said input key members are displayed on the top surface of said cover glass adjacent each of said key members.

12. The wristwatch of claim 10, wherein said numerical and operational symbols for said key members are displayed on a lower surface of said glass cover adjacent each of said key members.

13. The wristwatch of claim 10, wherein said numerical and operational symbols for said key members are displayed on a display panel mounted on said cover glass in said keyboard region.

14. The wristwatch of claim 13, wherein said display panel is mounted on the outer surface of said cover glass and includes a portion extending into the region intermediate said watch case and cover glass for retension in position therebetween.

15. A packing sheet for providing a water-tight seal between at least two actuatable members of a keyboard device and a key member displaceable toward and away from each said actuatable member for selective actuation thereof comprising a unitary sheet of resilient material formed with a keyboard region having a frusto-conical projection in registration with each actuatable member and projecting toward and supporting the associated key member and including a finger projecting from each of said projections toward the associated actuatable member and a conductive surface facing said actuatable member, and a peripheral lip formed about the keyboard region of said sheet of larger thickness than said keyboard region for providing the water-tight seal about said keyboard region, whereby manual displacement of said key member toward said actuatable member displaces the associated projection toward said actuatable member to effect actuation thereof, the resiliency of said resilient material returning said key member to its initial position upon release thereof.

16. An electronic wristwatch including a calculator comprising watch and calculator body means including display means and multi-input means; a watch case having an opening therethrough for receipt of said watch and calculator body means; a cover glass mounted in said opening on the display side of said watch case for permitting the viewing of said display means, said cover glass including a keyboard region having at least two openings therethrough for permitting actuation of said multi-input means; a case back releasably engaged by said watch case for forming the periphery of said wristwatch with said watch case and cover glass; and a unitary packing sheet disposed intermediate said cover glass and said watch and calculator body means having a keyboard region disposed over said multi-input means, said packing sheet formed of a resilient material having an electrically conductive surface on the side facing said multi-input means for selectively completing an electrical circuit to said multi-input means, said packing sheet formed with a peripheral lip having a greater thickness than the keyboard region of said packing sheet, said lip disposed about said multi-input means and watch and calculator body means for providing a water-tight seal about said watch case and openings through said cover glass, said lip being compressed between said cover glass and said case back, said packing sheet formed with a plurality of hollow frusto-conical projections for each of said openings through said cover glass in the keyboard region, said projections projecting from said sheet toward said openings and a finger projecting from each said projection towards and in registration with each of said multi-input means, whereby manipulation of a projection through the associated openings displaces said finger to the associated multi-input means for completing the electrical circuit to said multi-input means for the selective actuation of said multi-input means, said finger returning to its original position upon the release of said projection due to the resiliency of said packing sheet.

17. The wristwatch of claim 16, including a key member mounted for displacement in each of said watch case means openings in engagement with the projecting end of the associated projection, whereby a selected multi-input means may be actuated by engagement by a user from outside of said watch case means of the associated key member to displace the associated finger into engagement with said multi-input means, said key member returning to its original position upon release or by said user due to the resiliency of said resilient sheet.

* * * * *